United States Patent [19]

Groleau

[11] Patent Number: 5,766,654
[45] Date of Patent: Jun. 16, 1998

[54] APPARATUS FOR IMPROVING KNIT LINE STRENGTH IN POLYMERIC MATERIALS

[76] Inventor: Rodney J. Groleau, 1753 Apache Pass, Traverse City, Mich. 49684

[21] Appl. No.: 560,327

[22] Filed: Nov. 17, 1995

Related U.S. Application Data

[62] Division of Ser. No. 198,522, Feb. 18, 1994, abandoned.

[51] Int. Cl.⁶ ............................................. B29C 45/00
[52] U.S. Cl. .............................. 425/555; 264/69; 264/108; 264/328.8; 264/328.12; 425/573
[58] Field of Search ........................ 264/69, 328.1, 264/328.7, 328.8, 328.12, 328.9, 328.19, 328.14, 70, 71, 72, 108; 425/542, 555, 562, 563, 573, 560

[56] References Cited

U.S. PATENT DOCUMENTS

| 2,191,703 | 2/1940 | Anderson . | |
|---|---|---|---|
| 2,199,144 | 4/1940 | Tegarty . | |
| 4,399,093 | 8/1983 | Kirby et al. . | |
| 4,925,161 | 5/1990 | Allan et al. | 425/573 |
| 4,959,000 | 9/1990 | Giza | 425/129.1 |
| 4,994,220 | 2/1991 | Gutjahr et al. | 425/573 |
| 4,995,445 | 2/1991 | Shigyo | 425/812 |
| 5,069,840 | 12/1991 | Arnott | 425/572 |
| 5,204,051 | 4/1993 | Jaroschek | 425/812 |
| 5,225,136 | 7/1993 | Furugohri et al. | 425/328.8 |

FOREIGN PATENT DOCUMENTS

| 5-337990 | 12/1993 | Japan | 264/328.12 |

*Primary Examiner*—Tim Heitbrink
*Attorney, Agent, or Firm*—James M. Deimen

[57] ABSTRACT

The knit line strength and other packing related properties both aesthetic and functional of injection molded polymeric products is improved by equipping the mold with packing pins. The packing pins are similar in construction to mold ejector pins and may also be mold ejector pins depending on mold configuration. The packing pins are sequentially actuated during or after filling of the mold to cause flow of plastic either transverse or parallel to the direction of flow in a to and from manner. The result is a kneading action in the viscous flow and an oriented layering effect in the solidified plastic much like a scarf joint at the knit line location. The irregular shape of the layers enhances the mechanical strength at the knit line in addition to increasing the likelihood that long chain molecules will re-entangle between the two melt flows at the knit line. The packing of parts both with and without knit lines can be optimized in localized areas requiring more packing such as thick sections or in areas adjacent to insert molding locator pins which are pulled out of mold cavities during cooling causing voids which must be filled. Packing pins can also be used to cure gateblush by retracting the blush area adjacent the gate during fill and packing it forward into proper part location after the packing is complete. Packing pins can also be used in concert with gates both into and out of a molded part to enhance venting, provide gate shutoff and localize packing at the end of fill in the gate area.

16 Claims, 5 Drawing Sheets

APPARATUS FOR IMPROVING KNIT LINE STRENGTH IN POLYMERIC MATERIALS

This is a divisional application of application Ser. No. 08/198,552 filed on Feb. 18, 1994 now abandoned.

BACKGROUND OF THE INVENTION.

The field of the invention pertains to the injection molding of plastic materials and, in particular, to means and methods of improving the strength of plastic to plastic weld lines or knit lines in molded products and improving the ability to pack out various areas of a molded cavity. The invention also addresses methodology for improved venting of molds and the improvement of gateblush in molded parts.

Often in the injection molding manufacture of plastic products multiple gates or multiple flow paths or both are required in the mold. Welds or knit lines occur in the plastic where the flow paths join. Because of certain mold or product designs and injection molding techniques a "cold" weld or knit line can occur because the plastic does not fuse together completely. The long chain polymeric molecules from each flow front at the knit line fail to fully re-entangle and regain the integrity of the solidified melt. The result is a very weak area in the plastic product. Many polymeric materials, especially filled materials and liquid crystal polymers, exhibit an extreme loss of knit line strength relative to the balance of the product. Thus, knit line strength failure is a major cause of production rejects and the structural failures of plastic products in service.

U.S. Pat. No. 2,191,703 discloses means and method for the elimination of knit lines and welds by accurately controlling the location of the knit lines and by providing cavities in communication with the mold cavity at the knit line locations. The continued application of injection pressure forces the newly formed knit lines out of the mold and into the cavities provided. The result is a product substantially devoid of weak knit lines. Unfortunately, after ejection from the mold the product must be trimmed from the plastic formed in the cavities and then the trim line polished if needed for appearance.

U.S. Pat. No. 2,199,144 discloses the use of tangential injection about a toroidal shape such as a steering wheel thereby creating a continuous flow about the mold and a smooth merger of flows at each tangential gate.

Both of the above disclosures are directed to toroidal shapes with toroidal shaped strengthening inserts. These approaches to solving the weld or knit line problem are only applicable to a limited number of geometries and not generally applicable.

U.S. Pat. No. 4,399,093 discloses the use of differing cooling rates in the two flows of the molten plastic resin that merge at the knit line. Initially the resin flows fill the mold at relatively low pressure. Upon filling the mold cavity a high packing pressure is applied causing the colder less viscous resin to protrude into the warmer more viscous resin at the knit line. The result is a knit line of greater surface area and interlocking shape to improve the strength at the knit line. However, the differing temperatures of the resin flows are dependent on product shape and cooling rates within the mold and, therefor, limited to product shapes and molds that can produce the differential cooling rates in the resin flows without affecting product quality.

With a view toward providing a method of injection molding that has wider applicability in improving the knit line strength of plastic injection molded products, applicant has developed the new method and apparatus disclosed below.

SUMMARY OF THE INVENTION.

The invention contemplates the use of packing pins in the mold which in construction are similar to the ejector pins in most conventional plastic injection molds. The new packing pins are sequentially actuated during or after filling of the mold or during both phases of the process. The actuation of the packing pins is normally continued during cooling as necessary to cause flow of plastic parallel or transverse to the original direction of flow. (The primary flow causing the knit line to be strong will be the flow parallel rather than transverse.) The to and from kneading action, especially internal to the frozen plastic skin, results in the equivalent of a scarf joint at the knit line. The layering effect perpendicular to the knit line greatly expands the surface layer contact between the two flows. The irregular shape of the layers enhances the mechanical strength of the joint in addition to increasing the likelihood that long chain molecules will re-entangle between the two melt flows. Further, the anisotropic characteristics in the direction of flow that occur with some plastics can be improved by the scarfing and layering at the knit line.

Other applications of the packing pin concepts are in areas of relatively small cross-section or other hard to pack areas in molded parts. The actuation of packing pins in a localized area or any number of areas can be either in concert using a common mechanism such as an ejector plate or separately using air or hydraulic cylinders, cams or electrical devices. With separate actuation, each area can be packed a different amount.

Packing amounts or degrees can also be adjusted or modified by adjusting the packing pin diameter or stroke or both depending on the application.

The are other areas of packing pin applications in insert molding where locator pins for insert location protrude into the cavity of the mold. These pins are retracted at a proper time, generally after filling. The function of the pins are to support and locate the insert in the cavity while the plastic flows around it. After the part is full, the pins are retracted at a proper time which is long enough to ensure that the insert stays at its desired location, but soon enough to allow plastic to flow into the void created by the retracting pin. Many times the pins must be pulled prematurely to allow flow into the void area. This results in movement of the insert and a resultant substandard or reject part. Using a packing pin in concert with a locator pin can eliminate or reduce the movement by providing additional localized material and displacing it into the locator pin void as or after the locator pin is pulled allowing the void to be filled with the displaced material.

The packing pin concept can also be used in a gate area to reduce gateblush caused by plastic entering the mold. Gateblush is caused by displacement movement of plastic and impinging on the cavity wall thus eroding the partially solidified plastic on the cavity surface. A packing pin can be used to retract the cavity wall from the mold surface in the blush area. After the mold filling is complete, the packing pin can return the cavity surface to the proper position. During fill, the material in the "well" area caused by the retracted packing pin will not be eroded and thus the blush area on its surface will not be present. In this situation, when a packing pin is pushed forward excess plastic may be trapped in the cavity if the gate has been sealed. Excess material can be allowed to discharge out of the gate and back into the sprue or runner of the mold if gate seal has not been effected. The method used (gate seal or non gate seal) depends on the application.

A packing pin can also be utilized in conjunction with a subgate or other type of gate allowing plastic to enter or leave a cavity and thus provide a valve gating action coincident with packing a part.

In the case of a vent exiting a part, the packing can be used as a "powered vent" shut off within the exit gate runner to enhance the ability to remove air and other gases from the mold cavity. The pin can be in a fully retracted position allowing generous venting action of the mold. In an intermediate position the pin will shut off the vent and still be retracted below the mold's surface and available for the final packing. The pin can then be activated to the final flush position within the cavity to complete the packing process as previously described.

Pins which are only used to shut off vents as described above and not used for additional packing are also considered part of this invention.

A tapered egress from the vent pin to the outside of the mold surface is needed to allow the clearing of the vent and pin should plastic material be injected through the vent pin area while the pin is in the fully retracted position. This tapered egress can progress out to the side of the mold or can be angled to intersect the mold parting line where venting can be done in a conventional manner.

Packing pins can also be used in concert with the gates allowing material to enter into the part. This would be especially advantageous in subgates into the pin well. The activation of the packing pin will coincidentally seal the gate and allow additional packing using the pin. This will then allow shorter holding times and allow for more time to melt plastic for the next shot.

DESCRIPTION OF THE PREFERRED EMBODIMENTS.

Figure 1:
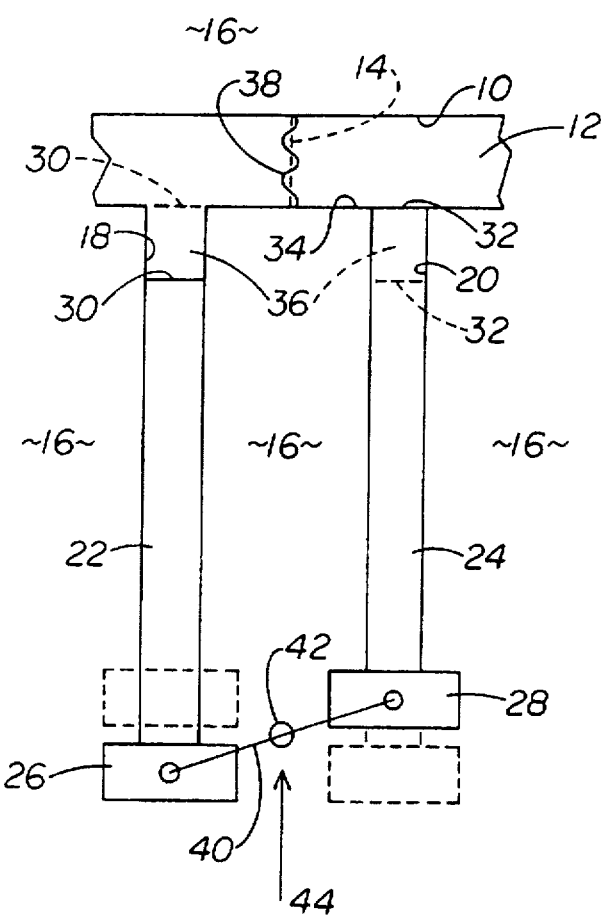
FIG. 1 illustrates schematically the packing action of the packing pins in communication with the mold cavity and in contact with the cooling plastic resin.

In FIG. 1 a portion of a mold cavity 10 is shown filled with viscous plastic resin 12 in the process of cooling. The location of the knit line or weld line is indicated by the dashed line at 14. This portion of the mold cavity 10 and plastic product being formed is a flat plate in form. Completely surrounding the mold cavity 10 is the mold body 16.

In communication with the mold cavity 10 are a pair of cylindrical holes 18 and 20 having a pair of packing pins 22 and 24 located therein. The packing pins 22 and 24 are slidable tight in their respective holes 18 and 20. The packing pins are suitably driven by a pair of hydraulic or pneumatic pistons 26 and 28 shown schematically. At the top of each packing pin stroke the tops of the packing pins 30 and 32 are level with the bottom 34 of the mold cavity 10.

With filling of the mold cavity 10 with resin 12 the cylindrical hole 18 containing retracted packing pin 22 also fills at 36 with resin. The packing pins 22 and 24 may be actuated to repeatedly stroke during or after filling with resin or both during and after filling with resin. As the pins 22 and 24 move to displace the plastic in the volume 36 and similar volume in hole 20, the knit line 14 becomes rippled (as shown by the solid line 38) in response to the to and fro motion in combination with the skin forming and cooling of the resin 12 in the mold cavity 10. Depending on overall mold cavity shape packing pins 22 and 24 to either side of the knit line 14 may be linked 40 together to provide alternating strokes. However, the final pack preferably moves both packing pins 22 and 24 to the top of their respective strokes with the tops 30 and 32 even with the bottom 34 of the mold cavity 10. This can be accomplished by moving the fulcrum 42 upward as indicated by the arrow 44.

Figure 2:
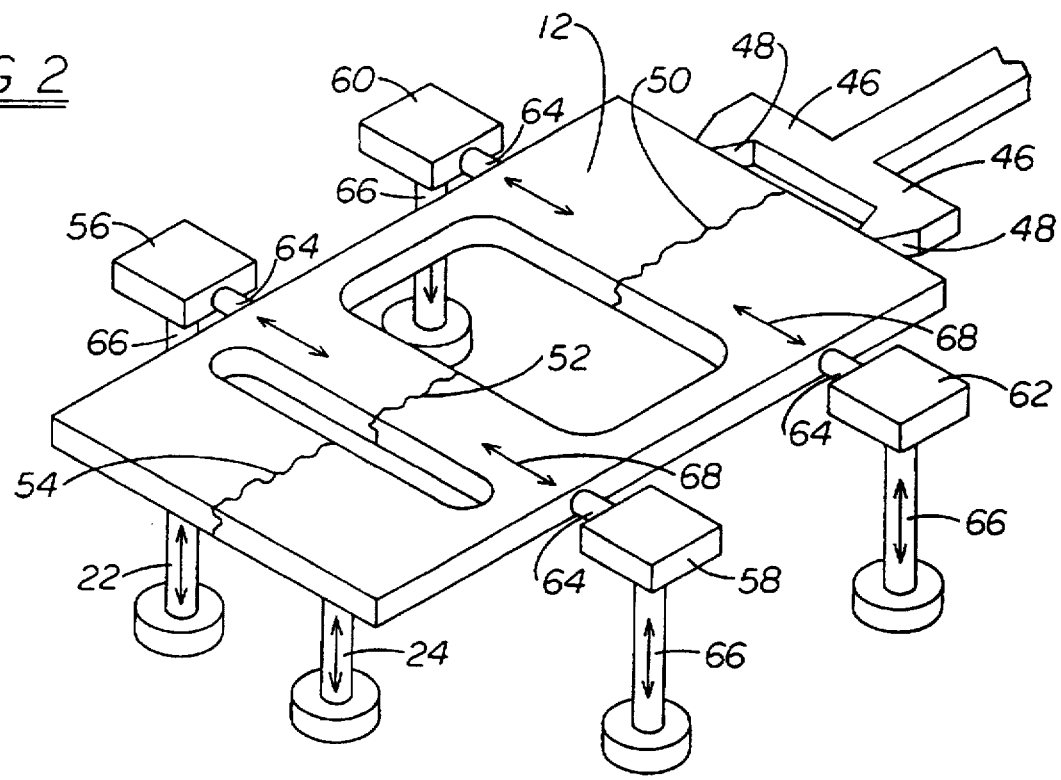
FIG. 2 illustrates schematically in perspective the packing action of the packing pins and packing wells in communication with the mold cavity and in contact with the cooling plastic resin.

In FIG. 2 the resin 12 within the mold cavity is illustrated in perspective with the mold deleted. The resin 12 is supplied to the mold cavity through a double sprue 46 and gates 48. Knit lines occur at three locations 50, 52 and 54. Below and to either side of knit line 54 is a pair of packing pins 22 and 24 as detailed in FIG. 1 and operated as explained for FIG. 1. Although similar pairs of packing pins might be employed for knit lines 50 and 52, a modified construction is illustrated. The modified construction comprises wells 56 and 58 to either side of the mold cavity opposite knit line 52 and wells 60 and 62 opposite knit line 50. The wells 56 and 58, 60 and 62 as shown are in communication through gates 64 with the mold cavity and filled with resin 12 as the mold is filled. As is illustrated further below in FIG. 3 the wells 56, 58, 60 or 62 can be combined with a hot runner or insulated runner system used to supply the material from the injection unit. The packing pins are used to provide packing of the mold cavity as well as providing the scarf joint action at the knit lines.

Extending below each well 56, 58, 60 and 62 are cylindrical holes with the packing pins 66 shown. The reciprocating movement of the packing pins 66 causes flow of resin 12 in and out of the mold cavity as indicated by arrows 68. The packing pins 66 operate generally in the same manner as in FIG. 1, however, this configuration, although more complicated in mold design, eliminates surface blemishes on the underside of the resin product. Use of the wells also permits the use of packing pins where the product thickness is not sufficient to directly apply the pins at the locations of the gates 64 or for other reasons related to mold or injection machine configurations.

Figure 3:
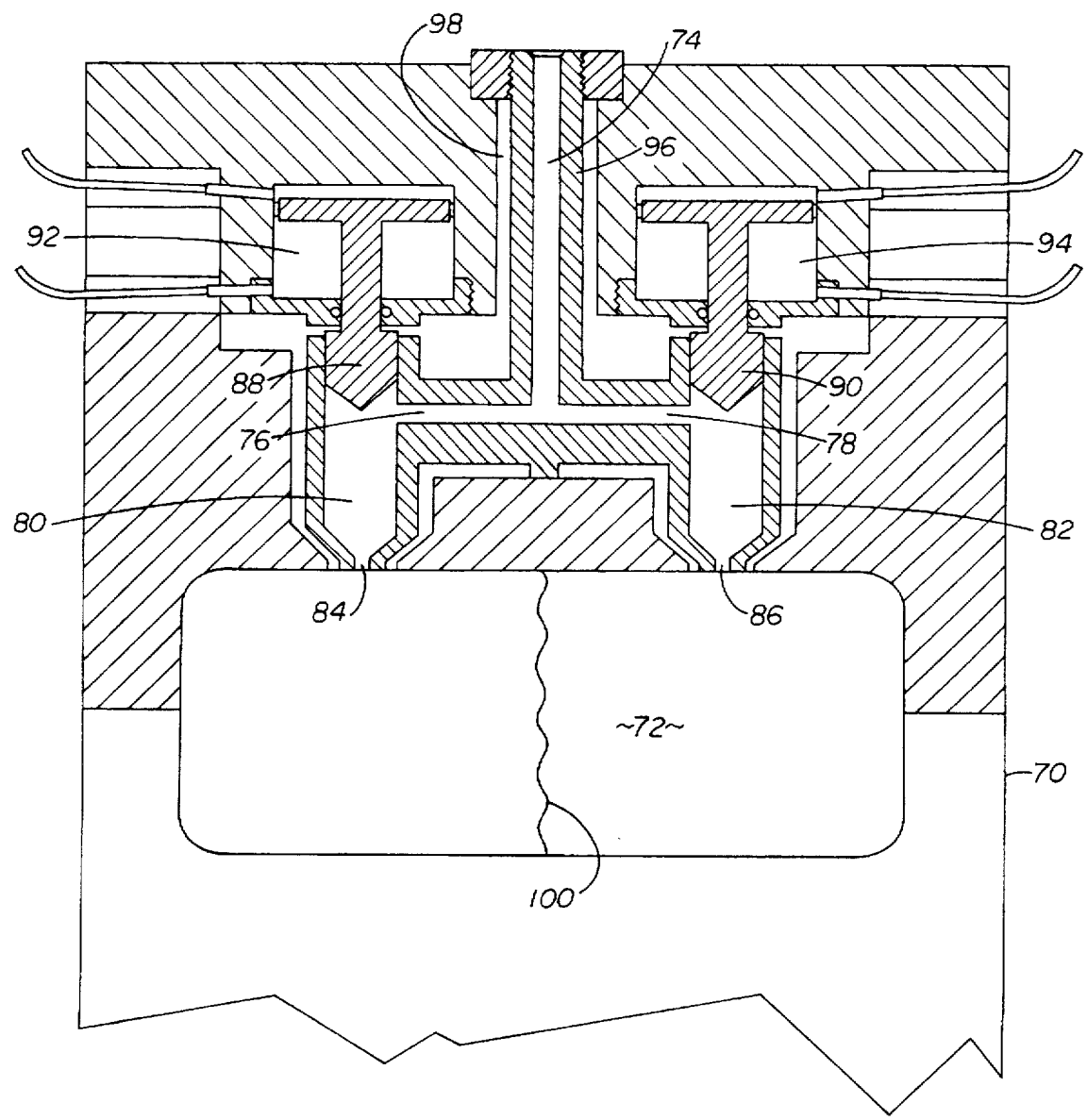
FIG. 3 illustrates schematically the combination of packing wells and packing pins with the sprue or runner system of a hot runner mold.

Illustrated in FIG. 3 is a mold 70 having a cavity 72. To supply hot molten resin to the cavity 72 there is a sprue 74 from the injector (not shown) and a pair of runners 76 and 78 leading to a pair of wells 80 and 82 with gates 84 and 86 communicating with the cavity. Fitted in the wells 80 and 82 are a pair of packing pins 88 and 90 shown in retracted position. Each packing pin is activated by a hydraulic, pneumatic or other gas powered piston (nitrogen or other inert gas) and cylinder mechanism as shown at 92 and 94. The sprue 74, runners 76 and 78, wells 80 and 82, and gates 84 and 86 are formed by a manifold 96 separated from the mold 70 by an air gap 98. Thus, the manifold forms a hot or insulated runner system. After the cavity 72 and the wells 80 and 82 are completely filled with resin both packing pins 88 and 90 can move forward an amount sufficient to seal off the wells from the runners 76 and 78. Then the packing pins 88 and 90 can be alternatingly extended and retracted to form the knit line 100 into a scarf-like joint. Although only two combined wells and packing pins are shown in FIG. 3 a plurality can be positioned to either side of the knit line 100 as in FIG. 2. Thus, sets of packing pins may operate in tandem.

In one example of the method of using the packing pins, the sequence would start with one set of packing pins retracted and the other set of packing pins at the top of their stroke. With the start of resin injection the mold cavity would be filled quickly, filling the volumes above the retracted pins. With the mold cavity filled and pressurized with resin, the packing pin sets can be reciprocated causing the retracted pin sets to move toward the mold cavity and the other pin sets to move away from the mold cavity. As a result the resin is displaced across the direction of flow in a substantially linear fashion between the locations of oppositely moving packing pins. The resin not already solidified near the mold cavity walls flows, and with the cooling and freezing, the orientation effect above occurs at knit lines between oppositely moving packing pins. The sequencing of the packing pins may be repeated at various intervals or only once depending upon the orientation effect required for the application.

Both sets of pins can start the injection cycle retracted or partially retracted to allow additional material to be put in the mold. This will allow more resin for more packing than with only one set of packing pins retracted. Both sets of packing pins can be sequenced forward initially in the packing sequence and then the reciprocating sequence may commence if appropriate. Referring to FIG. 3, by activating both packing pins 88 and 90 at the end of the injection stroke, the packing pins inject hot resin from the manifold into the mold cavity 72 to provide a final packing in the injection step. This technique minimizes the static pressure losses in the sprue 74, runners 76 and 78 and wells 80 and 82 and results in greater process uniformity and less product variability.

As a further alternative the method may also be initiated using only one pin on only one side of the knit line. Packing can be initiated by pushing the pin forward and the scarf-joint like flow can be accomplished by the additional internal compression of the unsolidified resin which will reverse the flow by expansion when the pin is retracted.

After the reciprocating sequencing is complete the retracted packing pins may be extended to their top most position to do a final packing of the resin in the mold cavity. The final stroke is adjusted to normally displace the resin necessary to make up for some or all of the shrinkage resulting from cooling and freezing of the resin. Thus, these packing pins are capable of additional packing during the solidification process, minimizing shrinks and voids in the plastic products.

The disclosure above is quite general with respect to the placement of the packing pins and mechanisms for operating the packing pins. The packing pins may be actuated mechanically, hydraulically, pneumatically or electrically as with ejector pins depending on the particular application. Activating the packing pins pneumatically or hydraulically imparts a hydrostatic force to the resin in the mold cavity that ultimately results in a uniform pressure across the resin in the mold cavity and uniform part shrinkage. Packing velocity can be controlled by controlling actuator speed by conventional means. Packing velocity is critical in some applications when repeatable stresses and static pressure gradients are important to provide repeatable part characteristics. The final stroke or pack need not bring the tops of the packing pins flush with the wall of the mold cavity but rather some resin protrusions may be allowed to extend into the packing pin holes. Thus, the final stroke may be determined by pressure in the resin in the mold cavity rather than mechanical position.

Depending on mold configuration the packing pins may be incorporated in movable or stationary portions of the mold. As disclosed above the packing pins may directly communicate with the mold cavity or communicate through wells and gates or through cold, hot or insulated runner systems to the mold cavity. Moreover, the packing pin system may be used to affect the physical properties of the cooling resin regardless of whether a knit line is present.

Figure 4:
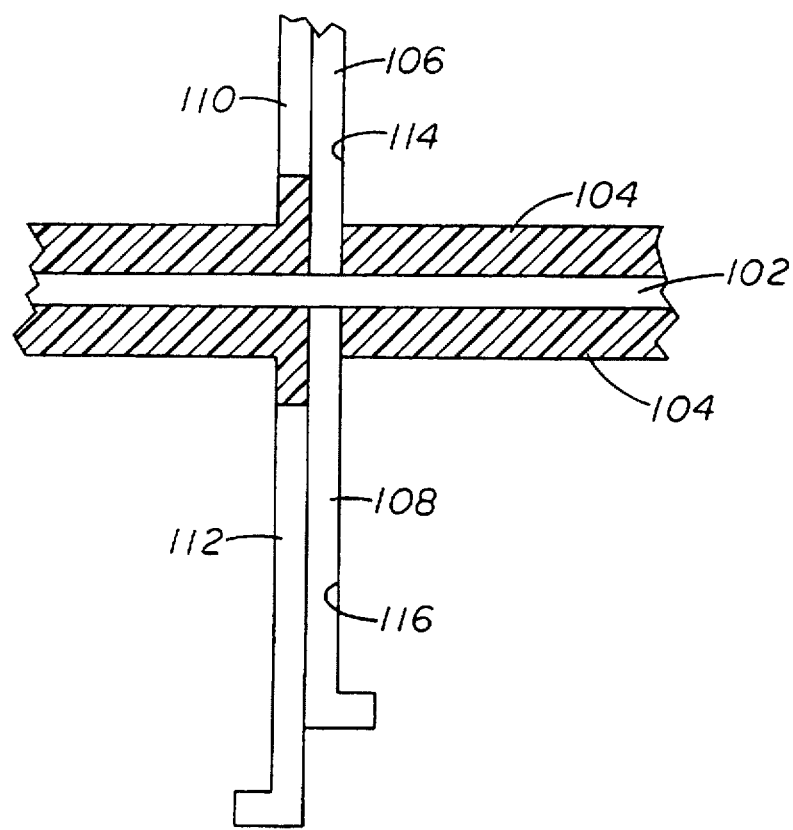
FIG. 4 illustrates schematically a mold insert positioned by locator pins.

In FIG. 4 an insert 102 is positioned and held within the mold cavity 104 by a pair of moveable locator pins 106 and 108. The locator pins 106 and 108 are normally withdrawn as sufficient resin is injected into the cavity 104 to retain the insert in place. In this embodiment, a pair of moveable packing pins 110 and 112 are located next to the locator pins 106 and 108. The packing pins 100 and 112 are retracted as shown, but, as the mold cavity 104 fills with resin and the locator pins are withdrawn, the packing pins 110 and 112 are activated to push resin into the voids formed by the withdrawing locator pins. To simplify construction, each of the pins is half round in cross-section, thus the upper location pin 106 and packing pin 110 fit within a round hole 114 in the upper half of the mold. Likewise, the lower locator pin 108 and packing pin 112 fit within a round hole 116 in the lower half of the mold.

Figure 5:
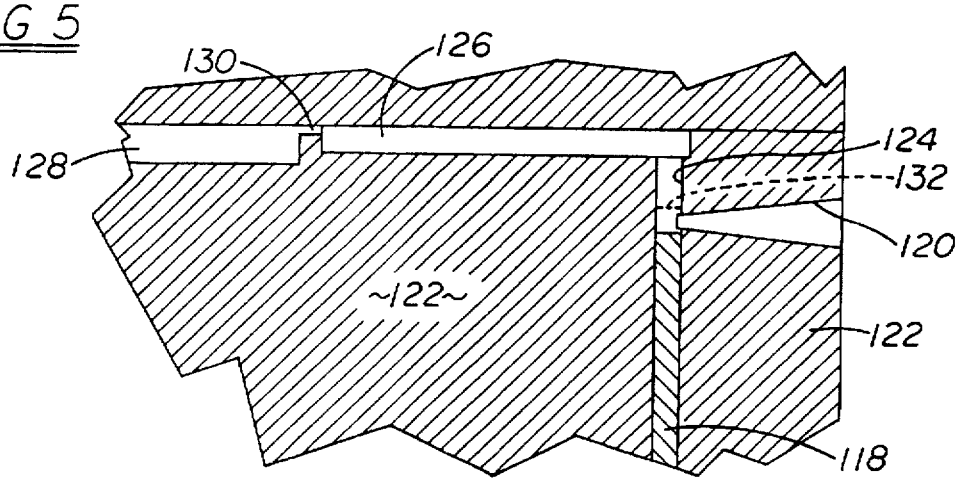
FIG. 5 illustrates schematically a packing pin and mold vent combination.

FIG. 5 illustrates a packing pin 118 retracted below a vent 120 that opens through the mold wall 122. The packing pin hole 124 communicates with the mold cavity 126 at a location spaced from the runner 128 and gate 130 to the mold cavity. As the mold cavity 126 fills with resin, air from the cavity leaves through the vent 120. At an appropriate moment in the injection cycle, as the resin moves into the packing pin hole 124, the packing pin 118 moves to the intermediate position 132 wherein the vent 120 is closed to prevent resin from flowing out the vent. The packing pin can then be subsequently moved to the cavity wall or reciprocated as noted above.

Figure 6:
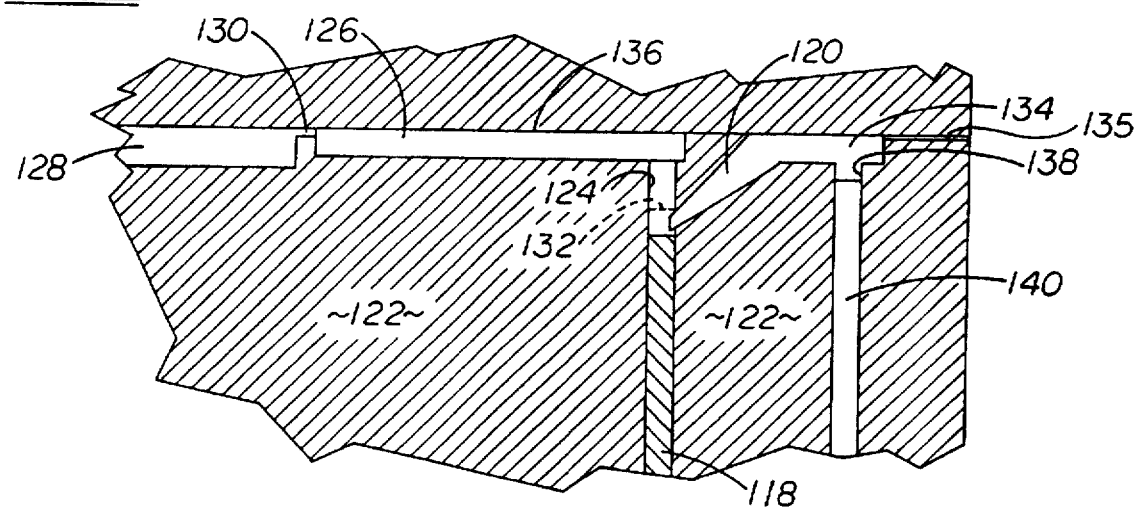
FIG. 6 illustrates schematically a packing pin and parting line mold vent combination.

In FIG. 6 the vent 120 is further modified by adding a vent well 134 along the parting line 136 of the mold 122. The vent well 134 is in communication with an ejector pin hole 138 and pin 140 such that any resin that has flowed out the vent 120 and into the well 134 can be ejected by the ejector pin 140 as the mold opens to release the resin product. The vent well 134 communicates with a conventional mold vent 135 to allow gasses an egress out of the mold.

Figure 7:
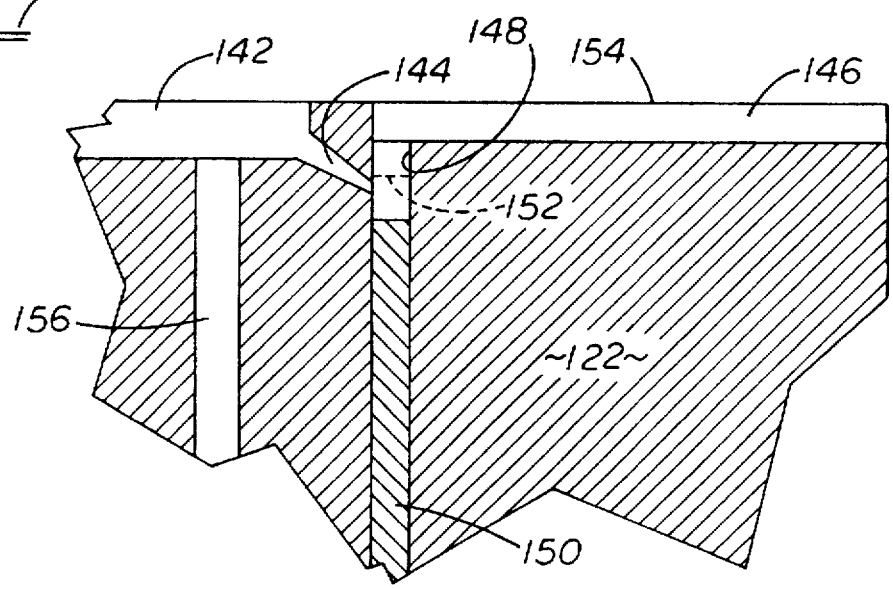
FIG. 7 illustrates schematically a packing pin and sub gate combination.

FIG. 7 illustrates further the use of the packing pin to close an indirect or subgate to the mold cavity. As shown, the runner 142 supplies a subgate 144 that communicates with the mold cavity 146 through a packing pin hole 148. Once the mold cavity 146 is filled, the packing pin 150 first closes the gate as shown by 152 and then moves further toward the cavity to complete the packing of the resin. Upon solidification of the resin, the mold parts along the parting line 154 to eject the product and the solidified resin in the runner 142 is also ejected by a pin 156. The gate 144 in FIG. 7, as well as the vents in FIGS. 5 and 6, are tapered to provide easy removal of resin trapped and solidified therein.

Figure 8A:
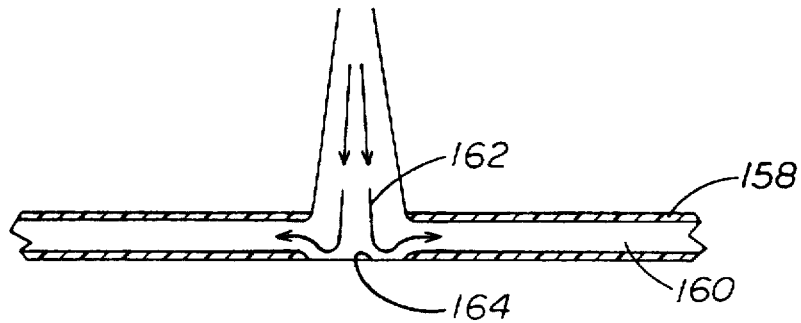
FIGS. 8A and 8B illustrates schematically a packing pin solution to gate blush erosion.
Figure 8B:
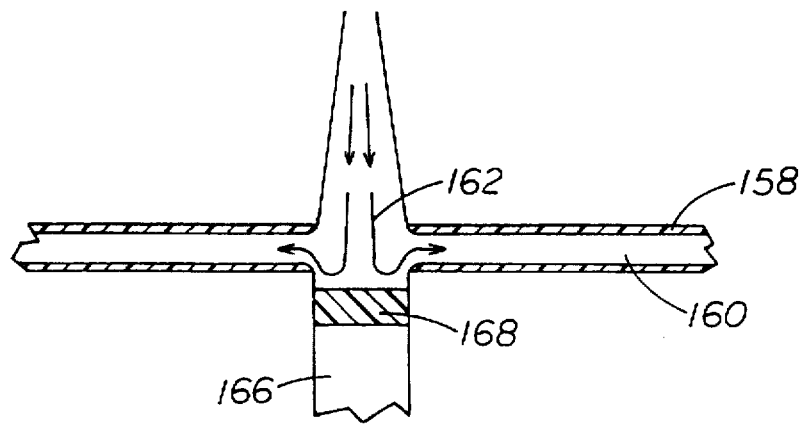

In FIGS. 8A and 8B the packing pin solution to gateblush is illustrated. Gateblush occurs when the hardening skin of resin 158 within the mold cavity 160 is eroded by the flow of additional resin shown by arrows 162 impinging upon the mold wall as at 164. To overcome this damage, which shows up as surface discoloration and streaking, the affected portion of mold wall is retracted by a packing pin 166 forming a part of the wall. At about the instant the injection of resin is completed, the packing pin is extended flush with the wall to pack the resin in the cavity. The resin 168 that collected on the retracted pin has not been eroded thus preventing gateblush on the finished product.

I claim:

1. Apparatus for causing a to and fro movement of molten plastic resin within an injection mold cavity during filling and cooling of the resin to effect packing of the resin comprising a plurality of holes in communication with the mold cavity, at least one gate for injection of resin into the mold cavity, said plurality of holes in communication with said at least one gate only through the mold cavity, slidable packing pins in the plurality of holes and means to selectably reciprocably move the packing pins in the plurality of holes during filling and cooling of the resin whereby retraction strokes of the packing pins cause resin to flow into the plurality of holes and extension strokes of the packing pins are limited to movement within the holes with no projecting of the packing pins into the mold cavity.

2. The apparatus of claim 1 wherein at least two of the holes and packing pins therein are paired to either side of a plastic resin knit line location within the mold cavity.

3. The apparatus of claim 2 wherein the paired holes and packing pins therein are linked to cause oppositely directed reciprocating movement of the pins.

4. The apparatus of claim 3 including means to nullify the oppositely directed reciprocating movement of the packing pins and cause both pins of the pair to reach and retain their top most positions prior to opening the mold in the molding cycle.

5. The apparatus of claim 1 wherein the communication of the holes with the mold cavity includes wells in communication through well gates with the mold cavity.

6. The apparatus of claim 5 wherein at least two of the wells are paired to either side of a plastic resin knit line location within the mold cavity.

7. The apparatus of claim 6 wherein the paired holes and packing pins therein are linked to cause oppositely directed reciprocating movement of the pins.

8. The apparatus of claim 1 wherein at least two of the holes and packing pins therein are paired and linked to cause oppositely directed reciprocating movement of the pins.

9. The apparatus of claim 8 including means to nullify the oppositely directed reciprocating movement of the packing pins and cause both pins of the pair to reach and retain their top most positions prior to opening the mold in the molding cycle.

10. The apparatus of claim 1 including at least one retractable locator pin adjacent at least one packing pin.

11. Apparatus for causing movement of molten plastic resin within an injection mold cavity during filling and cooling of the resin to effect packing of the resin comprising at least one hole in communication with the mold cavity, said at least one hole including a well in communication with the mold cavity, at least one gate for injection of resin into the mold cavity, said at least one hole in communication with said at least one gate only through the mold cavity, at least one slidable packing pin in the at least one hole and means to selectably reciprocably move the packing pin in the at least one hole during filling and cooling of the resin whereby retraction strokes of the packing pin cause resin to flow into the at least one hole and extension strokes of the at least one slidable packing pin extend the packing pin into the well.

12. The apparatus of claim 11 wherein the communication of the hole with the mold cavity includes a well in communication with the mold cavity through a well gate.

13. The apparatus of claim 11 wherein the hole and packing pin lie to one side of a knit line location in the mold cavity.

14. The apparatus of claim 11 including at least one retractable locator pin adjacent at least one packing pin.

15. Mold vent closure apparatus comprising a vent in communication with a mold cavity, a hole intersecting the vent and a reciprocably slidable packing pin in the hole, said hole providing the communication of the vent to the mold cavity, said vent and hole being configured to effect closure of the vent upon movement of the packing pin through the intersection of the hole and vent and upon further movement of the packing pin beyond the intersection to effect packing of resin in the mold cavity, said mold vent including a vent well communicating with the mold cavity and including an ejector pin hole and ejector pin therein intersecting the vent well.

16. The mold vent closure apparatus of claim 15 wherein the hole intersects the vent at a location spaced from the mold cavity.

* * * * *